US008505406B2

(12) United States Patent
Cowling

(10) Patent No.: US 8,505,406 B2
(45) Date of Patent: Aug. 13, 2013

(54) CONTROL DEVICE

(75) Inventor: David A. Cowling, Bristol (GB)

(73) Assignee: Wittenstein Aerospace and Simulation Ltd., Bristol (GB)

( * ) Notice: Subject to any disclaimer, the term of this patent is extended or adjusted under 35 U.S.C. 154(b) by 1633 days.

(21) Appl. No.: 11/844,939

(22) Filed: Aug. 24, 2007

(65) Prior Publication Data

US 2009/0031840 A1 Feb. 5, 2009

(30) Foreign Application Priority Data

Jul. 31, 2007 (GB) .................................. 0714916.4

(51) Int. Cl.
*G05G 9/047* (2006.01)
*B60K 20/00* (2006.01)

(52) U.S. Cl.
USPC .................................... 74/471 XY; 74/473.3

(58) Field of Classification Search
USPC .................... 74/471 XY, 523, 473.33, 473.3, 74/469, 470, 473.21, 473.23, 473.25, 473.29, 74/480 R, 484 R, 486, 519; 463/36, 37, 38; 273/148 B; 244/221, 223, 234, 236, 237
See application file for complete search history.

(56) References Cited

U.S. PATENT DOCUMENTS 2,475,484 A 7/1949 De Nise
2,678,179 A 5/1954 Feeney et al.
2,955,784 A 10/1960 Vogel et al.
3,795,150 A * 3/1974 Eckhardt .......................... 74/5.4
4,069,720 A 1/1978 Thor
4,071,209 A 1/1978 Hart
4,150,803 A 4/1979 Fernandez .................... 244/135
4,383,455 A 5/1983 Tuda et al.
4,513,235 A 4/1985 Acklam et al.
4,531,080 A * 7/1985 Nordstrom et al. ........... 318/628
4,982,918 A 1/1991 Kaye
5,107,080 A 4/1992 Rosen
5,265,486 A * 11/1993 Hartman et al. ................ 74/416
5,456,428 A 10/1995 Hegg ............................ 244/229
5,473,235 A 12/1995 Lance et al.
5,721,566 A * 2/1998 Rosenberg et al. ........... 345/161

(Continued)

FOREIGN PATENT DOCUMENTS

EP 0 085 518 8/1983
JP 08 57783 3/1996
WO WO 8809290 A * 12/1988
WO WO 01/54587 8/2001

OTHER PUBLICATIONS

Written Opinion of the International Search Authority for Application No. PCT/GB2008/002582, mailed Feb. 26, 2009.

(Continued)

*Primary Examiner* — Thomas R Hannon
*Assistant Examiner* — Adam D Rogers
(74) *Attorney, Agent, or Firm* — Marshall, Gerstein & Borun LLP

(57) ABSTRACT

A control device comprising: a reference frame; a stick; a pivot mounting the stick to the reference frame and defining a pivot axis; and an actuator for rotating the stick about the pivot axis. Mass balance is achieved by offsetting the centers of mass of the actuator and the stick from the pivot axis. Typically a line joining the centers of mass of the actuator and the stick substantially passes through the pivot axis. The actuator is a rotary actuator having a stator coupled to the stick and a rotor coupled to the reference frame.

16 Claims, 11 Drawing Sheets

(56) References Cited

U.S. PATENT DOCUMENTS

| | | | | | |
|---|---|---|---|---|---|
| 5,816,105 | A * | 10/1998 | Adelstein | 74/471 XY |
| 5,898,599 | A * | 4/1999 | Massie et al. | 345/161 |
| 5,900,710 | A * | 5/1999 | Gautier et al. | 318/675 |
| 6,644,600 | B1 | 11/2003 | Olson et al. | |
| 6,708,580 | B1 | 3/2004 | Smith et al. | 74/471 |
| 8,066,567 | B2 * | 11/2011 | Waggoner et al. | 463/38 |
| 8,087,619 | B2 * | 1/2012 | Hanlon et al. | 244/223 |
| 2003/0030621 | A1 | 2/2003 | Rosenberg et al. | |
| 2006/0254377 | A1 | 11/2006 | Henle | 74/471 |
| 2008/0079381 | A1 | 4/2008 | Hanlon et al. | |
| 2009/0229396 | A1 * | 9/2009 | Taylor et al. | 74/471 XY |

OTHER PUBLICATIONS

International Search Report received in International (PCT) Application No. PCT/GB2008/002582, mailed Feb. 26, 2009.

R.L. Hermans, "Design of an Actuated Side Stick Controller for the Simona Research Simulator", Sep. 1999, Technical University Delft, pp. 1-154.

* cited by examiner

CONTROL DEVICE

FIELD OF THE TECHNOLOGY

The present invention relates to a control device comprising: a reference frame; a stick; a pivot mounting the stick to the reference frame, the pivot defining a pivot axis; and an actuator for rotating the stick about the pivot axis.

BACKGROUND

A first known control device of this kind is described in US 2006/0254377. The stick is driven about two perpendicular pivot axes (A, B) by respective rotary actuators. A balance weight is provided on the A-axis in order to provide vertical mass balance about the B-axis. In other words, the balance weight ensures that there is no net induced moment about the B-axis when the device is subjected to a vertical acceleration perpendicular to the A and B axes.

A first problem with this arrangement is that the balance weight adds to the total weight of the device. A second problem is that the balance weight adds to the total volume of the device. A third problem is that the device is not horizontally mass balanced. Therefore, if the device is subjected to a horizontal acceleration, then there will be a net induced moment about the A or B axis. This mass imbalance must be compensated by one or both of the actuators, which adds complexity to the system.

A second known control device of this kind is described in U.S. Pat. No. 6,708,580. This device is also not horizontally mass balanced.

SUMMARY

In a first aspect, a control device comprises: a reference frame; a stick; a pivot mounting the stick to the reference frame and defining a pivot axis; and an actuator for rotating the stick about the pivot axis, wherein the centres of mass of the actuator and the stick are offset from the pivot axis such that if the control device is subjected to an acceleration orthogonal to the pivot axis, then the mass of the actuator and the mass of the stick generate moments about the pivot axis which act in opposite directions.

By offsetting the centres of mass of the actuator and the stick from the pivot axis, the mass of the stick can be at least partially balanced by the mass of the actuator without requiring an additional balance weight.

Typically a line passing through the pivot axis and the centre of mass of the stick also passes through the actuator. Preferably this line passes substantially through the centre of mass of the actuator. This enables the device to be mass balanced with respect to both vertical and horizontal acceleration of the device (in the case where the pivot axis is horizontal). In the more general case, if the line passes substantially through the centre of mass of the actuator, then the device is mass balanced with respect to two axes which are perpendicular to the pivot axis. However the centre of mass of the actuator may be slightly offset from this line and still provide an element of mass balance.

The actuator may be a linear actuator (such as a hydraulic piston or linear electric actuator) but more preferably the actuator is a rotary actuator having a stator coupled to the slick and a rotor coupled to the reference frame by a drive link and configured to rotate relative to the stator about a drive axis which is not co-linear with the pivot axis.

In a further aspect, a control device comprises: a reference frame; a stick; a pivot mounting the stick to the reference frame and defining a pivot axis; and a rotary actuator having a stator coupled to the stick and a rotor coupled to the reference frame by a drive link and configured to rotate relative to the stator about a drive axis which is not co-linear with the pivot axis.

In contrast with the devices described in US 2006/0254377 and U.S. Pat. No. 6,708,580 the drive axis of the rotary actuator is not co-linear with the pivot axis, enabling a more mass balanced arrangement. Also, a rotary actuator is typically more compact and lighter than a linear actuator, and is also typically easier to backdrive.

Preferably the drive link is pivotally coupled to the rotor by a first drive pivot and to the reference frame by a second drive pivot.

In certain examples the drive axis is not parallel with the pivot axis. For instance it may lie at a perpendicular or acute angle with the pivot axis. In other embodiments of the invention the drive axis is substantially parallel with the pivot axis.

Preferably the device is substantially mass balanced about the pivot axis.

BRIEF DESCRIPTION OF THE DRAWINGS

Examples will now be described with reference to the accompanying drawings, in which.

DETAILED DESCRIPTION

Figure 1:
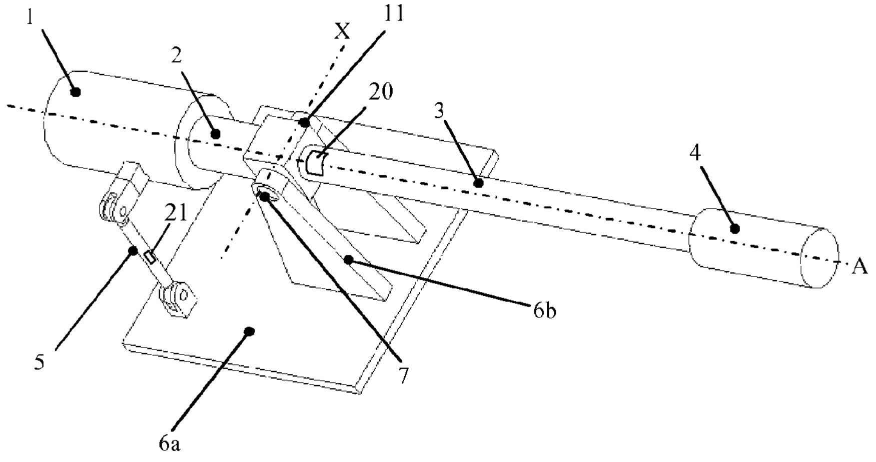
FIG. 1 is a front upper view of a first one-axis device in a nominal position.
Figure 2:
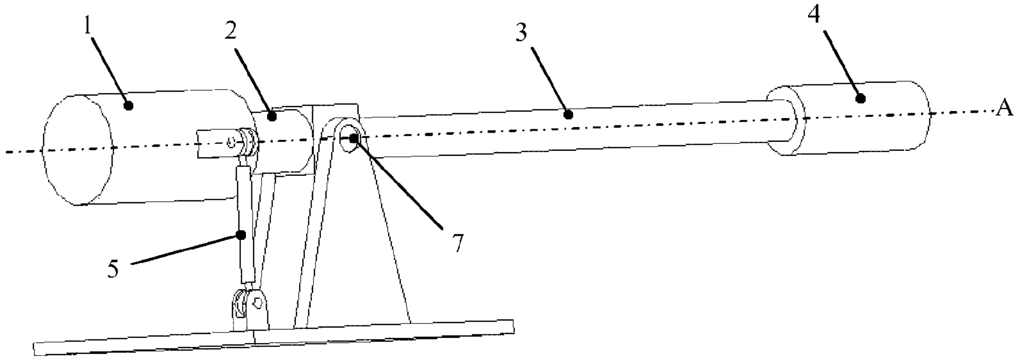
FIG. 2 is a rear ¾ view of the first one-axis device in the nominal position.
Figure 3:
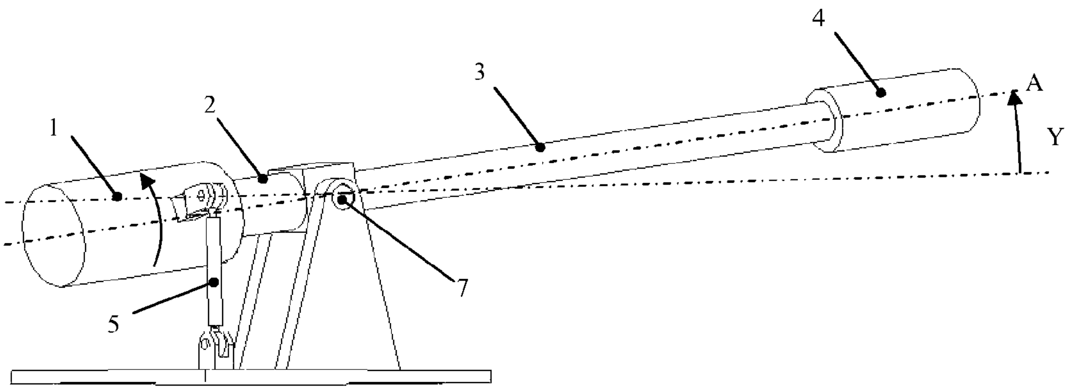
FIG. 3 is a rear ¾ view of the first one-axis device in a deflected position.

The control device shown in FIGS. 1-3 comprises a mounting plate **6*a* and a pair of pivot supports 6*b* fixed to the mounting plate 6*a*. The mounting plate 6*a*** is fixed in turn to the structure of a vehicle or flight simulator.

A stick is attached to a pivot block 11. The stick comprises a shaft 3 and a handle 4. A pivot shaft 7 extends from opposite sides of the pivot block 11, and is journalled in the pair of pivot supports 6*b* so that the stick is free to rotate about the pivot axis X defined by the pivot shaft 7.

A rotary actuator has an output shaft 2 which is fixed to the pivot block 11 and extends from an opposite side of the pivot axis X. The actuator has a casing 1 coupled to the mounting plate 6*a* by a drive link 5. The drive link 5 is pivotally coupled to the casing 1 by a first drive pivot and to the mounting plate 6*a* by a second drive pivot.

In the arrangement of FIG. 1, the output shaft 2 of the actuator remains fixed in relation to the stick (and thus acts as a stator) and the casing 1 of the actuator is configured to rotate about the drive axis of the actuator relative to the stator (and thus acts as a rotor). If the casing 1 rotates anticlockwise, then the drive link 5 drives the actuator down and the stick up as shown in FIG. 3. If the casing 1 rotates clockwise, then the drive link 5 drives the actuator up and the stick down.

A torque sensor 20 is provided to sense the torque applied to the output shaft 2. The torque sensor may be implemented for example by a set of strain gauges or piezo-electric elements. The torque sensor measures the force applied to the stick by a pilot.

When operating in an active mode, the actuator applies a force to the stick, for instance to provide force feedback to the pilot. When in passive mode the actuator has no power applied to it and the pilot is able to move the stick by driving the actuator backwards without a significant resistance. Alternatively a device to disconnect the actuator drive may be fitted to decouple the actuator.

Instead of employing a torque sensor 20 for measuring the torque applied to the output shaft 2 of the actuator, a force sensor 21 may be fixed to the drive link 5. In both cases the force/torque sensor will sense the moment about the pivot axis X.

By positioning the torque/force sensors to directly sense the output of the actuator, the sensors are insensitive to g induced moments and therefore the active control of the stick is also unaffected by g loads.

The centres of mass of the actuator and the stick are offset on opposite sides of the pivot axis X. As a result the device is vertically mass balanced about the pivot axis X—the vertical direction being perpendicular to the pivot axis X and to the axis Y labelled shown in FIG. 3.

Therefore if the stick is subjected to a vertical acceleration of ng then the moment about the pivot axis X in the vertical direction is given by:

$$M=-l_1m_1ng+l_2m_2ng \qquad \text{equation (1)}$$

where:

- $l_1$ is the distance between the pivot axis X and the centre of mass of the stick;
- $m_1$ is the mass of the stick (including the shaft 3 and the handle 4);
- $l_2$ is the distance between the pivot axis X and the combined centre of mass of the actuator and force sensor; and
- $m_2$ is the combined mass of the actuator and force sensor.

For mass balance we want M=0 or:

$$l_1m_1ng=l_2m_2ng \qquad \text{equation (2)}$$

which reduces to:

$$l_1m_1=l_2m_2 \qquad \text{equation (3)}$$

Thus by choosing values which satisfy equation (3), the device is vertically mass balanced about the pivot axis X.

Also, a line (labelled A in FIGS. 1-3) passing through the pivot axis X and the centre of mass of the stick also passes substantially through the centre of mass of the actuator. Therefore the device is horizontally mass balanced about the pivot axis X.

Figure 4:
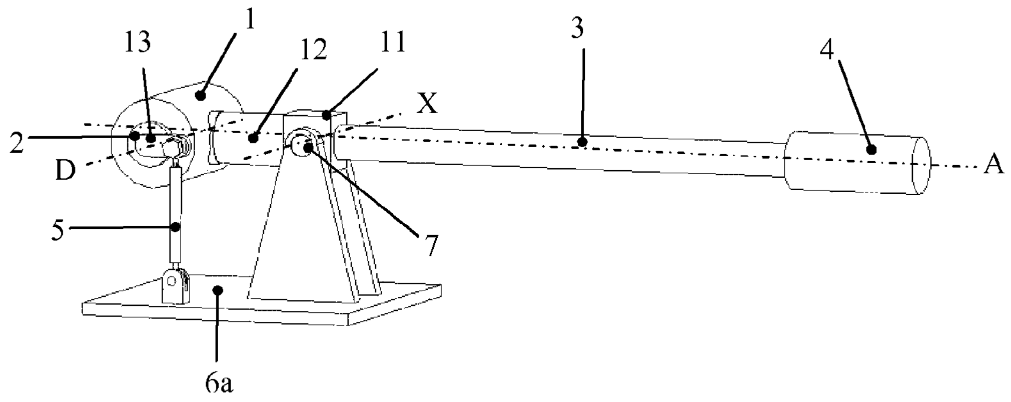
FIG. 4 shows a second one-axis device in a nominal position.
Figure 5:
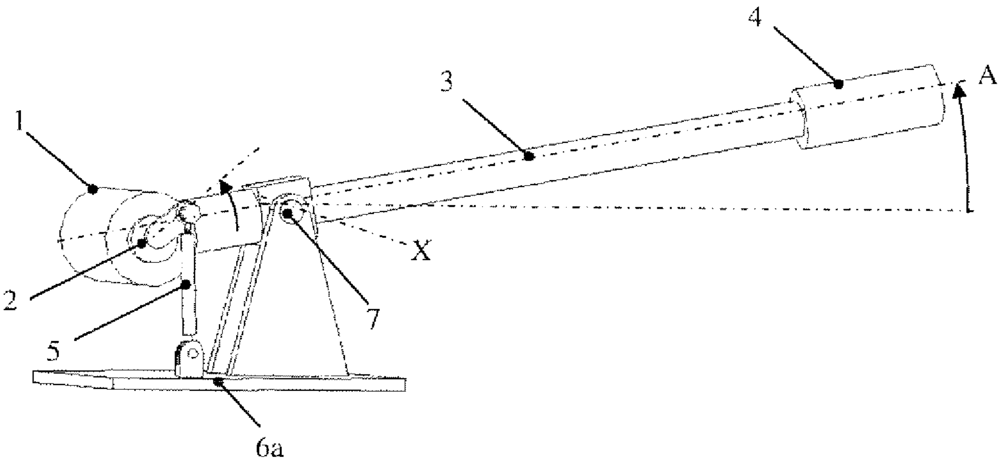
FIG. 5 shows the second one-axis device in a deflected position.
Figure 6:
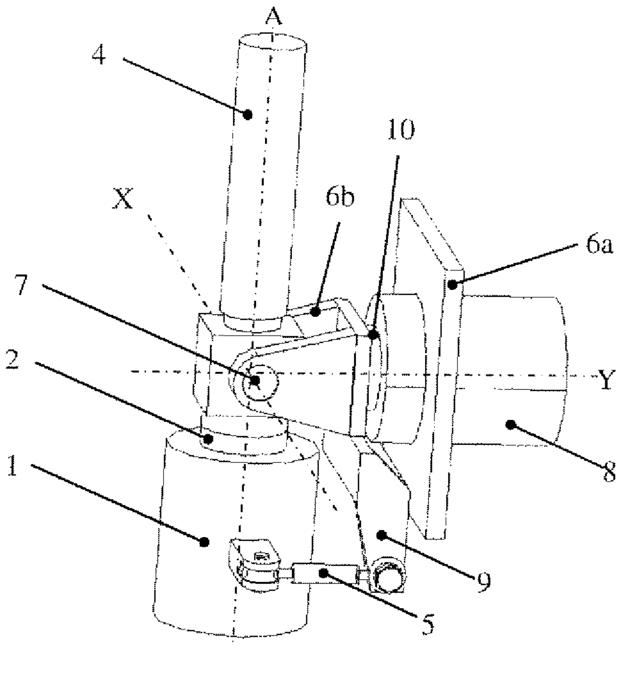
FIG. 6 is a side view of a first two-axis device in a nominal position.
Figure 7:
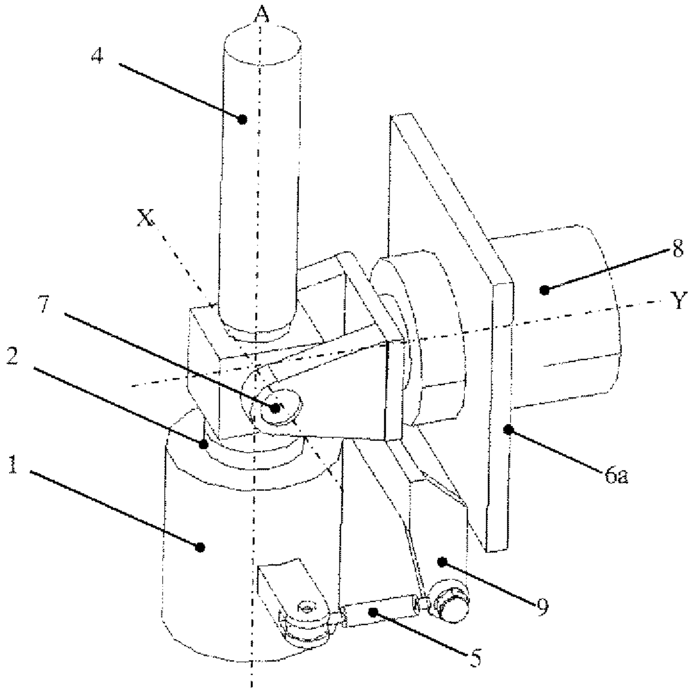
FIG. 7 is an upper ¾ view of the first two-axis device in the nominal position.
Figure 8:
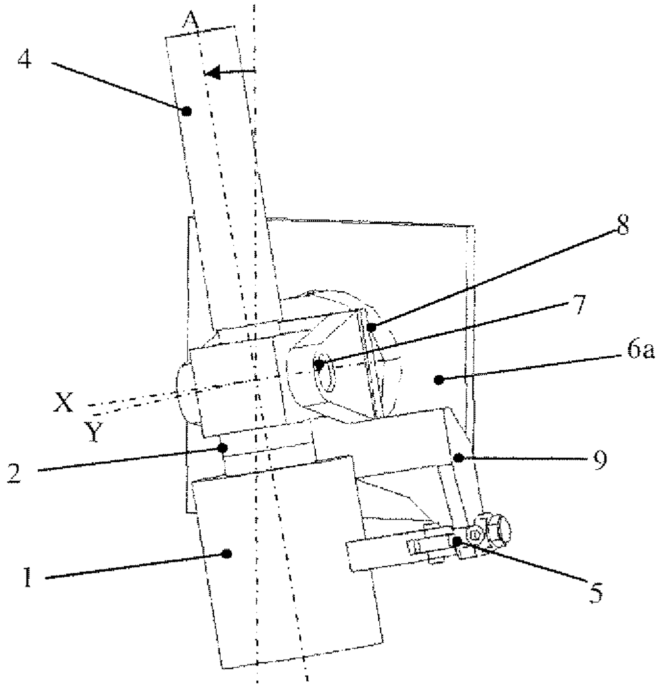
FIG. 8 is a front ¼ view of the first two-axis device in a rolled position.
Figure 9:
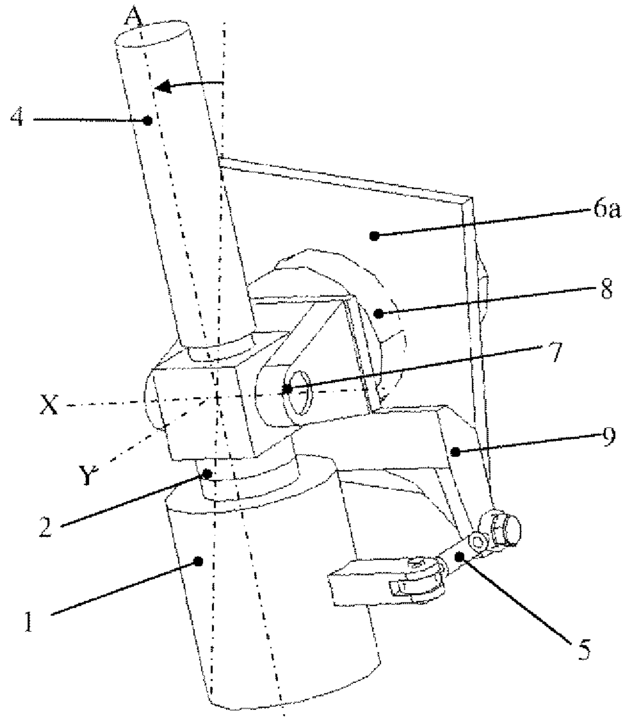
FIG. 9 is a side ¼ view of the first two-axis device in the rolled position.
Figure 10:
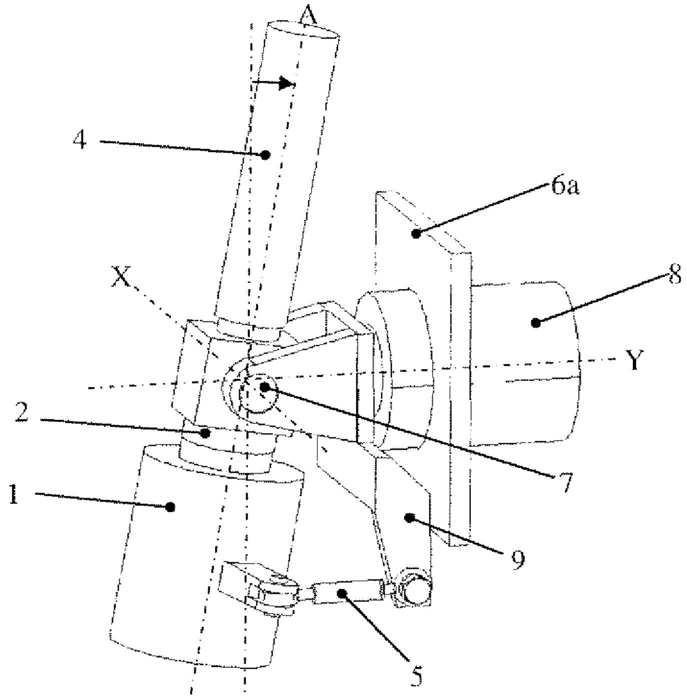
FIG. 10 is a side view of the first two-axis device in a pitched position.
Figure 11:
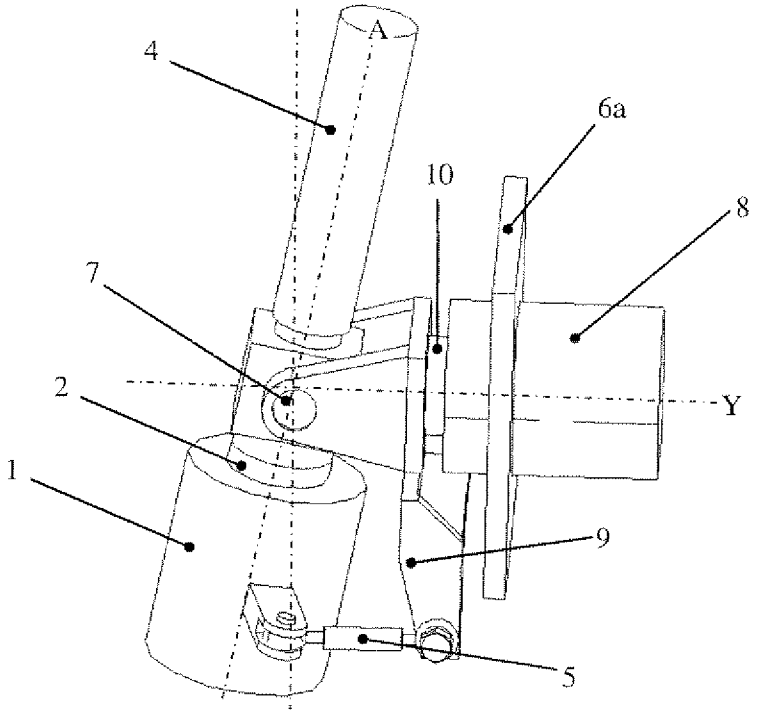
FIG. 11 is an upper side view of the first two-axis device in the pitched position.

FIGS. 4 and 5 show a second one-axis control device. The device is similar to the device of FIGS. 1-3, and equivalent features are given the same reference numeral. In the arrangement of FIGS. 1-3 the drive axis of the actuator is substantially co-linear with the line A and perpendicular to the pivot axis X. By contrast, in the arrangement of FIG. 4 the drive axis D is perpendicular to the line A and parallel with the pivot axis X.

The casing 1 of the actuator is fixed to the pivot block 11 by an arm 12, and the output shaft 2 is coupled to the mounting plate 6*a* by the drive link 5, and a crank shaft 13 extending at right angles to the drive axis. The drive link 5 is pivotally coupled to the crank shaft 13 by a first drive pivot and to the mounting plate 6*a* by a second drive pivot.

In the arrangement of FIG. 4, the casing 1 remains fixed in relation to the stick (and thus acts as a stator) and the output shaft 2 rotates (and thus acts as a rotor). If the output shaft 2 rotates anticlockwise, then the drive link 5 drives the stick up and the actuator down as shown in FIG. 5. If the output shaft 2 rotates clockwise, then the drive link 5 drives the stick down and the actuator up.

In common with the device of FIG. 1, a torque sensor (not shown) is provided to sense the torque applied to the output shaft 2.

FIGS. 6-11 show a first two-axis control device. The device is similar to the device of FIGS. 1-3, and equivalent features are given the same reference numeral.

The mounting plate 6*a* is fixed to a casing 8 of a second (Y-axis) actuator. Instead of being fixed to the mounting plate 6*a*, the pivot supports 6*b* are fixed to a mounting bracket 9, which is fixed in turn to an output shaft 10 of the Y-axis actuator. Thus in the two-axis device the pivot supports 6*b* and mounting bracket 9 provide a first (X-axis) reference frame and the mounting plate 6*a* provides a second (Y-axis) reference frame. The drive link 5 is pivotally coupled to the casing 1 by a first drive pivot and to the mounting bracket 9 by a second drive pivot.

Figure 12:
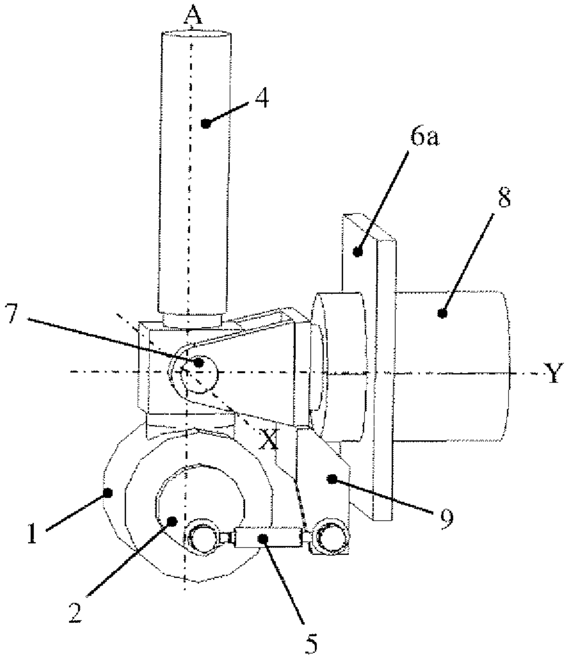
FIG. 12 is a side view of a second two-axis device in a nominal position.
Figure 13:
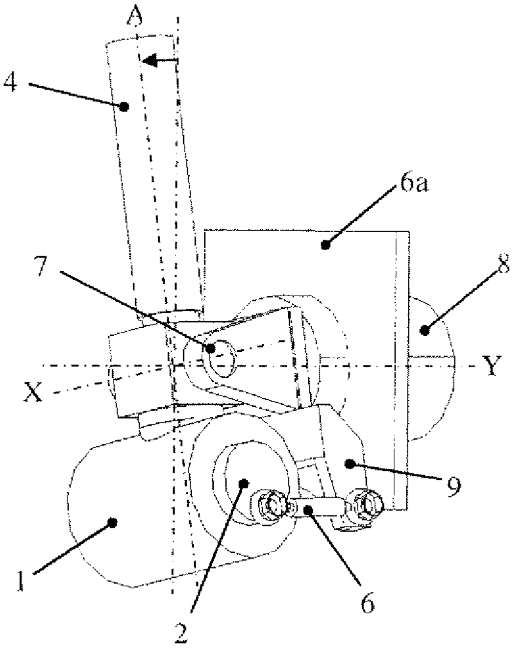
FIG. 13 is a side view of the second two-axis device in a rolled position.
Figure 14:
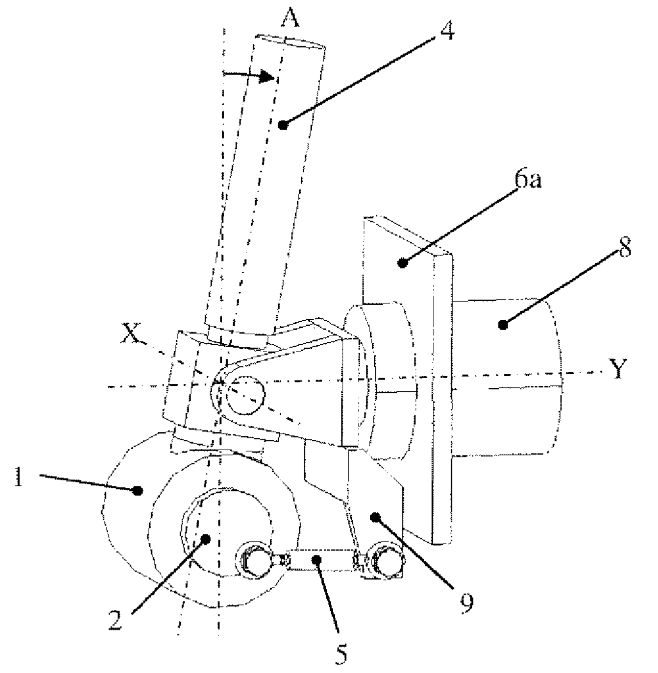
FIG. 14 is a side view of the second two-axis device in a pitched position.

FIGS. 12-14 show a second two-axis control device. The device is similar to the device of FIGS. 6-11, and equivalent features are given the same reference numeral.

In contrast to the arrangement of FIGS. 6-11 (and in common with the arrangement of FIG. 4) the drive axis of the X-axis actuator is at right angles to the line A. The casing 1 of the actuator is fixed to the pivot block 11, and the output shaft 2 of the X-axis actuator is coupled to the mounting bracket 9 by the drive link 5.

The two-axis devices shown in FIGS. 6-15 are provided with an X-axis torque sensor (not shown) to sense the torque applied to the X-axis output shaft 2 and a Y-axis torque sensor (not shown) to sense the torque applied to the Y-axis output shaft 10.

Figure 15:
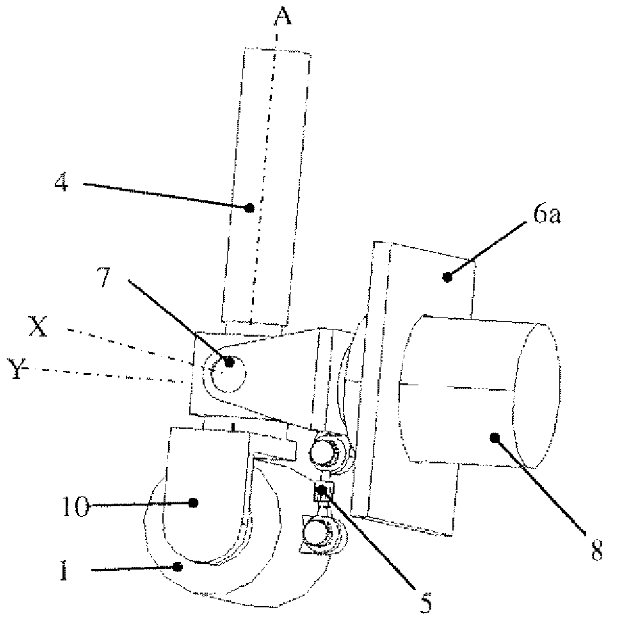
FIG. 15 is a rear ¼ view of a third two-axis device in a nominal position.
Figure 16:
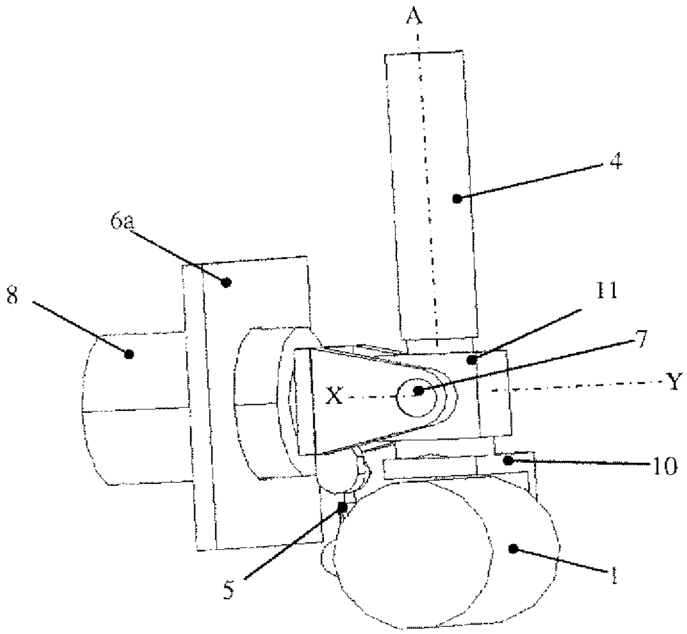
FIG. 16 is a front ¼ view of the third two-axis device in the nominal position.

FIGS. 15 and 16 show a third two-axis control device. The device is similar to the device of FIGS. 12-14, and equivalent features are given the same reference numeral. In contrast to the arrangement of FIGS. 12-14, the output shaft of the X-axis actuator is coupled to an L-shaped bracket 10 which is rigidly connected to the pivot block 11. The casing 1 of the X-axis actuator is coupled to the mounting bracket 9 by the drive link 5. Thus in this case the output shaft of the actuator acts as a stator, and the casing acts as a rotor. This arrangement has the potential to save some space when roll deflections occur. A similar variant of the device of FIGS. 4 and 5 may also be used.

Figure 17:
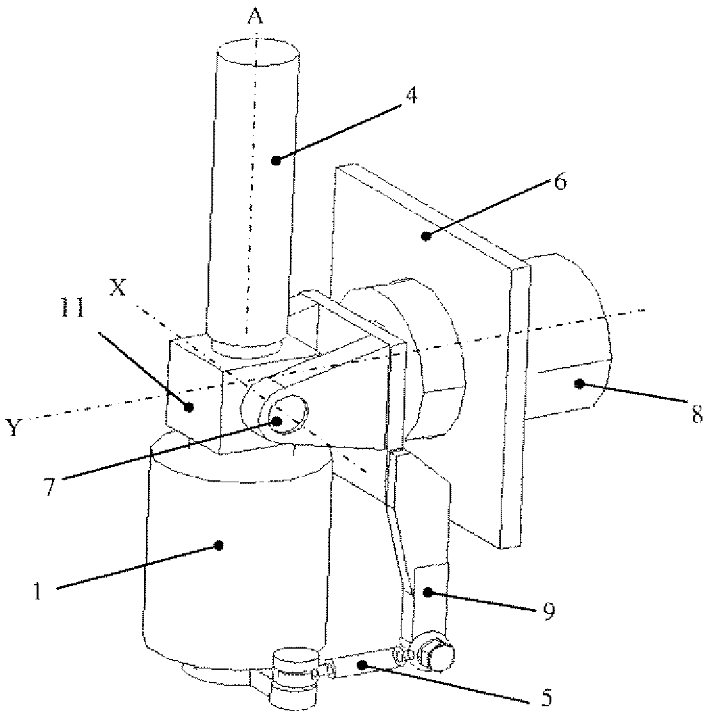
FIG. 17 is a front ¼ view of a fourth two-axis device in a nominal position.

FIG. 17 show a fourth two-axis control device. The device is similar to the device of FIGS. 6-11, and equivalent features are given the same reference numeral. In contrast to the arrangement of FIGS. 6-11, the casing 1 of the X-axis actuator is rigidly connected to the pivot block 11, and the output shaft is coupled to the mounting bracket 9 by the drive link 5. Thus in contrast to the arrangement of FIGS. 6-11, the output shaft of the actuator acts as a rotor and the casing 1 acts as a stator.

Figure 18:
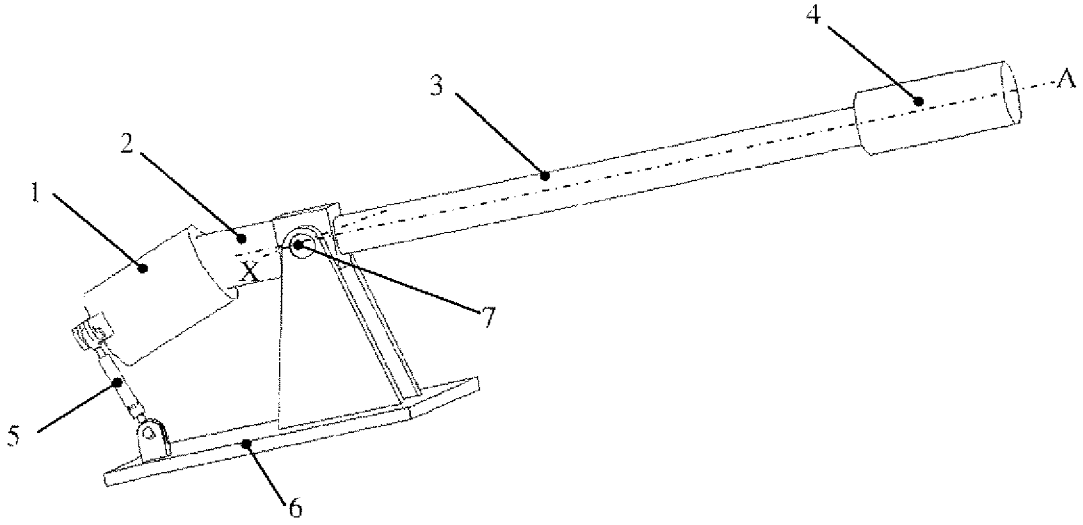
FIG. 18 shows a third one-axis control device.

FIG. 18 show a third one-axis control device. The device is similar to the device of FIGS. 1-3, and equivalent features are given the same reference numeral. In contrast to the device of FIGS. 1-3, the actuator is angled downwardly with respect to the line A passing through the pivot axis X and the centre of mass of the stick. Although the device is not mass balanced against horizontal acceleration orthogonal to the pivot axis X, since the centre of mass of the actuator lies in a vertical plane containing the line A the device is mass balanced against vertical acceleration.

The two-axis devices of FIGS. 6-17 are vertically and horizontally mass balanced about both the X and Y-axes.

The devices shown in the figures may be used on a vehicle such as a helicopter. For instance the one-axis devices shown in FIGS. 1-5 and 18 may be used as the collective lever of a helicopter. Alternatively the devices may be used in a simulator.

Although the above has been described above with reference to one or more preferred embodiments, it will be appreciated that various changes or modifications may be made without departing from the scope of the invention as defined in the appended claims.

What is claimed is:

1. A control device comprising: a reference frame; a stick; a pivot mounting the stick to the reference frame and defining a pivot axis; and an actuator for rotating the stick about the pivot axis, wherein the actuator and the stick are offset from the pivot axis such that when the control device is subjected to an acceleration orthogonal to the pivot axis the mass of the actuator and the mass of the stick generate moments about the pivot axis which act in opposite directions, and wherein the actuator is a rotary actuator having a stator coupled to the stick and a rotor coupled to the reference frame by a drive link, the rotor is configured to rotate relative to the stator about a drive axis which is not co-linear with the pivot axis, and the stator remains fixed in relation to the stick when the stick rotates about the pivot axis.

2. The control device of claim 1, wherein a line passing through the pivot axis and the centre of mass of the stick passes substantially through the centre of mass of the actuator.

3. The control device of claim 1, wherein the control device is substantially mass balanced about the pivot axis when the moments generated by the mass of the actuator and the mass of the stick act in the opposite directions and are substantially equal.

4. The control device of claim 1, further comprising a sensor for sensing a force applied to the stick.

5. The control device of claim 4, wherein the sensor detects an output of the actuator.

6. The control device of claim 1, further comprising a second pivot mounting the reference frame to a second reference frame and defining a second pivot axis; and an actuator for rotating the reference frame about the second pivot axis.

7. A control device comprising: a reference frame; a stick; a pivot mounting the stick to the reference frame and defining a pivot axis; and a rotary actuator for rotating the stick about the pivot axis, the rotary actuator having a stator coupled to the stick and a rotor coupled to the reference frame by a drive link, wherein the rotor is configured to rotate relative to the stator about a drive axis which is not co-linear with the pivot axis, and wherein the stator remains fixed in relation to the stick when the stick rotates about the pivot axis.

8. The control device of claim 7, wherein the drive link is pivotally coupled to the rotor by a first drive pivot and to the reference frame by a second drive pivot.

9. The control device of claim 7, wherein the drive axis is not parallel with the pivot axis.

10. The control device of claim 7, wherein the drive axis intersects with the pivot axis.

11. The control device of claim 7, wherein the drive axis is substantially parallel with the pivot axis.

12. The control device of claim 7, wherein the drive axis is co-linear with a line passing through the pivot axis and the centre of mass of the stick.

13. The control device of claim 7, wherein the control device is substantially mass balanced about the pivot axis when the moments generated by the mass of the actuator and the mass of the stick act in the opposite directs and are substantially equal.

14. The control device of claim 7, further comprising a sensor for sensing a force applied to the stick.

15. The control device of claim 14, wherein the sensor detects an output of the actuator.

16. The control device of claim 7, further comprising a second pivot mounting the reference frame to a second reference frame and defining a second pivot axis; and an actuator for rotating the reference frame about the second pivot axis.

* * * * *